Jan. 4, 1944.   S. M. MacNEILLE   2,338,654
PROJECTION SCREEN
Filed April 8, 1942
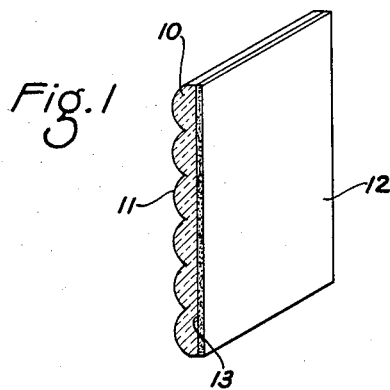
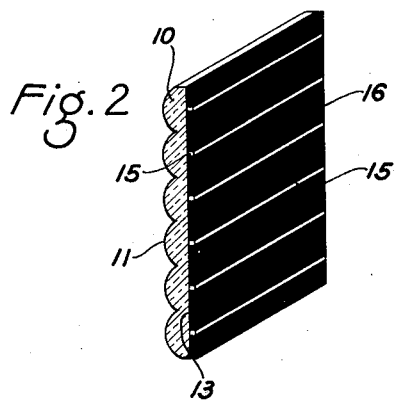
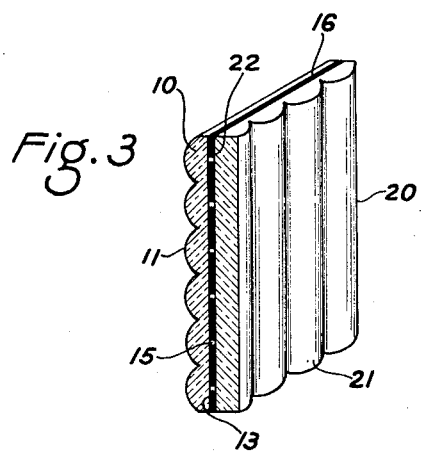
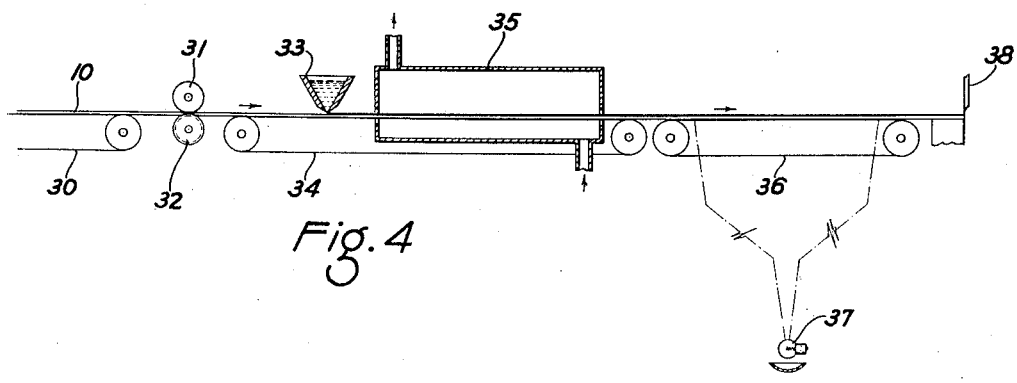
Stephen M. MacNeille
INVENTOR
BY
ATTORNEYS Patented Jan. 4, 1944

2,338,654

UNITED STATES PATENT OFFICE 2,338,654

PROJECTION SCREEN

Stephen M. MacNeille, Rochester, N. Y., assignor to Eastman Kodak Company, Rochester, N. Y., a corporation of New Jersey Application April 8, 1942, Serial No. 438,135

7 Claims. (Cl. 88—28.93)

The present invention relates to projection screens and more particularly to the type known as transmission or rear projection screens.

In rear projection screens, the diffusing screen is located between the projector and the audience. The function of such a screen is to transmit as much of the light reaching it as possible and at the same time to diffuse the light throughout a large angle. Heretofore, screens of this type have been proposed which were made up of, or embossed with, a large number of small lenticulations. Due to the minuteness of these lenses, which is necessary to obtain good resolving power at the normal viewing distance, difficulty is encountered in making a tool or die that will give the desired size and maintain a smooth surface to prevent scintillation and scattering. Further, the lenses must have a large relative aperture in order to give sufficient light spread and there must be a minimum of waste space between them in order to maintain high transmission. Heretofore, it has been difficult and impractical to make a rear projection screen embodying all of the aforementioned desirable characteristics.

Many of the aforesaid difficulties are overcome by the use of cylindrical lenses and in order to spread the light in more than one plane, two sets of cylindrical lenses with their axes substantially perpendicular to each other are employed. Rollers that are suitable for embossing good spherical lenses are hard to make, whereas rollers suitable for cylindrical lenses are readily made and can be held to very exact tolerances. By properly shaping the embossing roller used for cylindrical lenses, the lenses nearer the edge of the screen can be corrected for the different angle of incidence of light from the projector, so that the angle of light spread may be made symmetrical about a line toward the central viewer rather than symmetrical about the line of incidence. With spherical lenses this correction can only be made in one dimension if a continuous embossing process is used.

The primary object of the invention is to provide a rear view projection screen in which the vertical and horizontal light spread can be controlled.

Another object is to provide a rear view projection screen in which two sets of cylindrical lenses are utilized having their axes perpendicular to each other.

And another object is to provide a rear view projection screen in which a masking means is interposed between the two sets of cylindrical lenses and has light transmitting portions.

A still further object is to provide a rear view projection screen in which the masking means permits only the transmission of the paraxial portion of the light transmitted by each cylindrical lens element.

And yet another object is to provide a rear projection screen which can be produced by a continuous process and fulfill the requirements listed above.

Further objects and advantages will be suggested to those skilled in the art by the description which follows.

The above and other objects are embodied in a projection screen in which a light transmitting support has cylindrical lens elements formed in each surface thereof, the axes of which are perpendicular to each other, and a mask interposed between the cylindrical lens elements for transmitting only the paraxial portion of the light transmitted by one set of cylindrical lenses.

Reference is hereby made to the accompanying drawing wherein like reference characters designate similar parts and wherein:

Fig. 1 is an enlarged perspective view of a portion of the screen, showing one of the sets of cylindrical lenses with a layer of photographic emulsion;

Fig. 2 is a view similar to Fig. 1 in which the photographic emulsion has been exposed and processed;

Fig. 3 is an enlarged perspective view of the screen in its final form; and

Fig. 4 is a diagrammatic view showing a method of producing the support with exit slits by a continuous process.

The use of cylindrical lenses in projection screens is well known in the art, and the use of a masking means is also old, but in the combination a new result is obtained in which the vertical and horizontal light spread can be controlled. A screen incorporating cylindrical lenses without a masking means is perfectly feasible but does not embody the principal advantage that lies in the present invention, namely, the blackening of the viewed side except for small exit pupils or slits, thus largely reducing screen reflectivity and enhancing use in undarkened conditions.

This latter effect can be produced with the use of cylindrical lenses in the following manner: A light transmitting support 10, as shown in Fig. 1, has cylindrical lenses 11 embossed on one side thereof, and a photographic emulsion 12 coated on the other surface 13. The support 10 may be of glass, a transparent plastic, or any other suitable transparent material. The position of the photographic emulsion 12 is such that it will be in the focal plane of the cylindrical lenses 11. Exit slits are then registered in the photographic emulsion by exposing the emulsion layer to a light source with the lenses toward the light. This light source should be approximately in the position that the projector will occupy relative to the screen.

The film or emulsion is then processed by a photographic reversal process so that at the focus of each lens 11 is a transparent or translucent line or exit slit 15 in an otherwise black sheet of film 16, as shown in Fig. 2. Obviously, the screen so far will transmit all the light incident on it from the projector but will spread the light only in one plane. A second light transmitting support 20, having a plane surface 22 and embossed cylindrical lenses 21 on the other surface, is laminated to the layer 12 with said surface 22 adjacent thereto, light spread in all planes through the beam axis is thereby obtained, and the finished screen assumes the form shown in Fig. 3. Furthermore, the assembled screen will look substantially black since most of the screen area is black. The embossing or lenses 21 on the viewed side actually enhance this effect by providing a non-planar surface.

Registration of the exit slits 15 can be done continuously in the embossed support before it is cut into screens by having the cylinders lie in the direction of motion of the film. This may be accomplished, as shown diagrammatically in Fig. 4, by placing the support 10 on a pair of endless belts 30, the support 10 being in a semiplastic state and supported along the edges by the belts 30. The support 10 is then passed between the roller 31 and the embossing roller 32 to form the cylindrical lenses on the lower surface of the support. Alternatively, the support 10 may be used in its set condition and the embossing roller 32 may be heated to a sufficient temperature, in any well known manner, so as to form the cylindrical lenses. The layer of photographic emulsion is applied to the support as it is carried under the hopper 33 by the belts 34. It is to be understood that the support, at the time the emulsion is coated on the support, is set and in a rigid state. The support is then passed through a drying cabinet 35 to dry the emulsion and is then carried by the belts 36 over the light source 37 to expose the emulsion for the exit slits. The support may then be cut to the size desired, as indicated by the knife edge 38, and the emulsion processed by a photographic reversal process to provide the transparent or translucent exit slits. The support 20 is then laminated to the layer 12 as heretofore described to produce the completed screen. It is obvious that other arrangements may be used, and the apparatus described is merely illustrative.

The same process may be used for making screens having spherical lenticulations by preventing relative movement between the support and the exposing light source, either by intermittently stopping the section of the support being exposed or by moving the light source synchronously with the support. In this manner the latent image of a small round exit pupil is formed in the emulsion layer. Otherwise the relative movement between the support and light source elongates the exit pupil to the shape of a slit and reduces the effective blackness of the screen and increases the reflectivity of the screen.

Having now particularly described my invention, what I desire to secure by Letters Patent of the United States and what I claim is:

1. A projection screen comprising a light transmitting support having cylindrical lens elements formed in opposite surfaces thereof, the cylindrical lens elements in one surface being located transversely of the cylindrical lens elements in the other surface, and a masking means interposed between said surfaces and having parallel light transmitting portions corresponding to and coextensive with each lens element in one of said surfaces and for transmitting all the paraxial light transmitted by said lens elements.

2. A projection screen comprising a light transmitting support having cylindrical lens elements formed in opposite surfaces thereof, the cylindrical lens elements in one surface being located transversely of the cylindrical lens elements in the other surface, and a masking means interposed between said surfaces, having low reflectance opaque portions, and having parallel light transmitting portions corresponding to and coextensive with each lens element in one of said surfaces and at the foci said lens elements.

3. A projection screen comprising a light transmitting support having cylindrical lens elements formed in opposite surfaces thereof, the cylindrical lens elements in one surface having their axes perpendicular of the cylindrical lens elements in the other surface, and a means interposed between said surfaces having parallel light transmitting portions corresponding to and coextensive with each lens element and for transmitting all the paraxial light transmitted by the lens elements on one side of said support and for substantially absorbing the light incident on the other side of said support.

4. A projection screen comprising a light transmitting support having cylindrical lens elements formed in opposite surfaces thereof, the cylindrical lens elements in one surface being located transversely of the cylindrical lens elements in the other surface, and a developed light sensitive layer interposed between said surfaces, having low reflectance portions, and having parallel light transmitting portions at the foci of the lens elements on one surface of said support corresponding to and coextensive with each lens element in said surface and for transmitting all the paraxial light transmitted thereby.

5. A projection screen comprising a light transmitting film base having opposite surfaces and a plurality of cylindrical lens elements formed in one of said surfaces, a developed silver halide layer on the other surface of said base and having parallel light transmitting portions at the foci of said lens elements corresponding to and coextensive with each of said lens elements, and a second light transmitting film base having opposite surfaces and a plurality of cylindrical lens elements formed in one surface thereof, the other surface of the second film base being secured to said layer with the cylindrical lenses of the two film bases perpendicular to each other and on opposite surfaces of said screen.

6. The method of producing a light transmitting projection screen which comprises continuously moving a support of transparent material, forming cylindrical lenticular elements in one surface of said moving support and extending in the direction of movement thereof, applying a light sensitive layer to the other surface of said moving support, and projecting light through said cylindrical lenticular elements and the support during movement thereof to expose only the portions of said light sensitive layer at the linear foci of said elements.

7. The method of producing a light transmitting projection screen which comprises continuously moving a support of transparent material, forming elongated and longitudinal lenticular elements in one surface of said moving support and extending in the direction of movement thereof, applying a light sensitive layer to the other surface of said moving support, projecting light through said lenticular elements and the moving support to expose only the portions of said light sensitive layer at the linear foci of said elements, processing said light sensitive layer by a photographic reversal process to render translucent the exposed portions of the developed layer, and placing adjacent to said developed layer one surface of a second support having formed in its other surface elongated lenticular elements substantially perpendicular to the lenticular elements of the first support.

STEPHEN M. MacNEILLE.